United States Patent Office 2,875,177
Patented Feb. 24, 1959

2,875,177

PREPARATION OF ORGANOPOLYSILOXANES CONTAINING SILICON-BONDED CARBOXYALKYL GROUPS

Ben A. Bluestein, Schenectady, N. Y., assignor to General Electric Company, a corporation of New York No Drawing. Application March 20, 1957
Serial No. 647,192

4 Claims. (Cl. 260—46.5)

This invention is concerned with a process for preparing organopolysiloxane compositions containing carboxyalkylsiloxy units. More particularly, the invention is concerned with a process for forming intercondensed organopolysiloxanes containing carboxyalkylsiloxy units and siloxy units free of silicon-bonded carboxyalkyl groups but containing silicon-bonded organic radicals selected from the class consisting of monovalent hydrocarbon radicals and substituted monovalent hydrocarbon radicals, which process comprises effecting reaction between an aqueous solution of a water-soluble carboxyalkylpolysiloxane and an organosilane of the formula I     $R_m Si(OR')_{4-m}$ (hereinafter referred to as "organoalkoxysilane") where R is a member selected from the class consisting of monovalent hydrocarbon radicals and halogenated monovalent hydrocarbon radicals, R' is a lower alkyl radical containing from 1 to 5 carbon atoms (e. g., methyl, ethyl, propyl, butyl, isopropyl, amyl, etc.), and $m$ is a whole number equal to from 1 to 3, inclusive. Examples of what R may represent are given below.

In the copending application of Glenn D. Cooper and Maurice Prober, Serial No. 529,896, filed August 22, 1955, and assigned to the same assignee as the present invention, there are disclosed and claimed liquid and solid organopolysiloxanes having the average composition

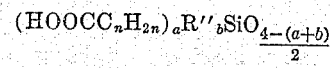

where the HOOC group is attached to a carbon atom other than a silicon-bonded carbon atom, R" is a monovalent hydrocarbon radical, for instance, methyl, ethyl, propyl, cyclohexyl, phenyl, diphenyl, naphthyl, tolyl, benzyl, and halogenated aryl radicals, for example, chlorophenyl, dibromophenyl, etc., radicals; $n$ is an integer equal to from 2 to 18, inclusive, and preferably from 2 to 5 inclusive; $a$ has a value of from 0.01 to 2.0; the sum of $a+b$ is from 1.0 to 2.5, inclusive. The R" group may be on the same silicon atom as the carboxyalkyl group or may be on a different silicon atom.

When one attempts to obtain the above-described carboxyalkylpolysiloxanes by (1) the cohydrolysis of chlorosilanes composed of, for instance, cyanoethyltrichlorosilane and other cohydrolyzable organochlorosilanes, for instance, dimethyldichlorosilane, trimethylchlorosilane, methyltrichlorosilane, diphenyldichlorosilane, etc., and (2) hydrolyzing the cyanoalkylpolysiloxane to the carboxyalkylpolysiloxane, one finds that the usual methods for making such copolymers by cohydrolysis are attended by a marked tendency toward homopolymerization. Thus, if one tries to copolymerize trimethylchlorosilane with cyanoethyltrichlorosilane, because of the difference in the rates of hydrolysis, the cyanoethyltrichlorosilane may hydrolyze and polymerize in advance of the trimethylchlorosilane so that the reaction hydrolysis product may contain, in addition to copolymeric materials, unduly large amounts of polymers derived from the individual starting chlorosilanes. One attempt to overcome this obstacle has been to attempt to react aqueous solutions of carboxyethylpolysiloxanes with cohydrolyzable organochlorosilanes; however, this technique gave no indication of homogeneous copolymer formation.

Unexpectedly, I have discovered that I am able to make copolymeric organopolysiloxanes containing carboxyalkylsiloxy units and intercondensed organosiloxy units in which the organic group is free of carbon-bonded carboxyl groups, if one employs for co-reaction purposes an aqueous solution of a carboxyalkylpolysiloxane and an organoalkoxysilane of the formula

where $m$, R and R' have the meanings given above.

Among the water-soluble carboxyalkylpolysiloxanes which may be employed in the practice of my invention are those which have the formula

where $n$ is an integer equal to from 2 to 4. These compositions, which may be obtained by hydrolyzing cyanoalkylpolysiloxanes of the formula

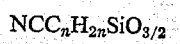

where $n$ has the meaning given above, may contain polysiloxane molecules of the above formula having silicon-bonded hydroxyl groups of silanol groups which add to the water-solubility. The cyanoalkylpolysiloxanes used for this purpose and methods for preparing the same are more particularly disclosed and claimed in the copending application of Maurice Prober and Glenn D. Cooper, Serial No. 401,701 filed December 31, 1953, and assigned to the same assignee as the present invention. Thus, the cyanoalkylpolysiloxane of the above formula may be hydrolyzed in an alkaline or acidic aqueous medium to convert the cyanoalkyl radicals attached to silicon to carboxyalkyl radicals. The cyanoalkyl polysiloxanes can be prepared by the hydrolysis of the various silanes which contain both silicon-bonded chlorine atoms and silicon-bonded cyanoalkyl radicals.

The silanes containing both silicon-bonded chlorine and silicon-bonded cyanoalkyl radicals are prepared by the method disclosed in the copending application of Cooper and Prober, Serial No. 401,704, in the copending application of Maurice Prober, Serial No. 401,702, both applications being filed December 31, 1953, and in U. S. Patent 2,776,306 of Quintin P. Cole issued on January 1, 1957, the applications and patent (which by reference are made part of the disclosures of the instant application) being assigned to the same assignee as the present invention. For example, silanes containing both a cyanoalkyl radical and chlorine atoms attached to silicon may be prepared by refluxing, for instance, methyldichlorosilane, trichlorosilane, etc., in the presence of a trialkyl amine such as tributyl amine, and a suitable nitrile containing olefinic unsaturation. Suitable nitriles include, for instance, methacrylonitrile, alpha ethylacrylonitrile, crotononitrile, acrylonitrile, etc. These compounds contain three chlorine atoms attached to silicon and may be converted to a dichlorosilane. For example, methyl betacyanoethyldichlorosilane may be prepared by refluxing betacyanoethyltrichlorosilane with methyl magnesium bromide. The same compound may also be prepared by reacting betacyanoethyltrichlorosilane with dimethyl cadmium.

Cyanoalkylorganopolysiloxanes can be prepared from the silanes described above by hydrolyzing various cyanoalkyl hydrolyzable silanes in the manner disclosed in the aforementioned Prober and Cooper application, Serial No. 401,701. Thus, the cyanoalkylorganopolysiloxane fluid may be prepared by hydrolyzing a compound, such as cyanoethyltrichlorosilane, by agitating the silane for several hours in water or in a mixture of ether and ice.

In hydrolyzing the cyanoalkylpolysiloxane to the corresponding carboxyalkylpolysiloxane, the amount of acid or base employed is not critical since the acid or base acts only as a catalyst. However, for convenience, one advantageously employs relatively large amounts of the acid or base since the hydrolysis of the reaction is speeded up thereby. Thus satisfactory hydrolysis of the cyanoalkylpolysiloxane has been obtained using from 0.1 to 20 or more equivalents of acid or base per cyanoalkyl group. Further directions for making the cyanoalkylpolysiloxanes and the hydrolysis of the latter to carboxyalkylsilanes may be found in the copending application of Glenn D. Cooper and Maurice Prober, Serial No. 529,896, filed August 22, 1955, which by reference is made part of the disclosures of the instant application.

The carboxyalkylpolysiloxane, which should be soluble in all proportions in water, is advantageously employed in molar concentrations ranging from 0.1 to 95 mol percent while the other copolymerizable organoalkoxy silane of the Formula I is employed in amounts ranging from about 5 to 99.9 mol percent. The carboxyalkylpolysiloxane is advantageously dissolved in water in concentrations ranging, by weight, from 10 to 90 percent solids based on the total weight of the water and the carboxyalkylpolysiloxane.

In preparing the mixture of the aqueous solution of the carboxyalkylpolysiloxane and the organoalkoxysilane, it is only necessary to dissolve each of these two ingredients in the desired proportions, employing moderate heat if desired. Gently warming the reaction mixture at temperatures ranging from about 30° to 75° C. accelerates the cohydrolysis and intercondensation of the product. Thereafter the intercondensed reaction mass can be isolated by evaporation of the water employing preferably vacuum and lower temperatures in order to avoid undue condensation of the formed organopolysiloxane. Because of the large amount of trifunctional siloxy units present due to the use of, for instance, carboxyalkylpolysiloxanes of the formula $$HOOCC_nH_{2n}SiO_{3/2}$$

where $n$ has the value given above, the reaction mixture should be dried carefully at temperatures of from 40 to 75° C. to obtain a product which can be readily molded or dissolved in suitable organic solvents as well as in water to make treating solutions for impregnating and coating purposes. Upon heating the intercondensed carboxyalkyl organopolysiloxane (containing silicon-bonded carboxyalkyl groups and silicon-bonded R groups) at elevated temperatures (e. g., at 125° to 200° C.), the intercondensation product will further condense and convert to the substantially cured, solid state.

In order that those skilled in the art may better understand how the present invention may be practiced, the following examples are given by way of illustration and not by way of limitation. All parts are by weight.

*Example 1*

The cyanoethyltrichlorosilane employed in this and in the following example was prepared by effecting reaction between equimolar amounts of acrylonitrile and trichlorosilane using about 5 mol percent tributyl amine as a catalyst as is more particularly described in the copending application of Maurice Proper, Serial No. 401,702, filed December 31, 1953. The cyanoethyltrichlorosilane thus obtained was hydrolyzed by pouring it into a sufficient amount of water to effect hydrolysis of all the silicon-bonded chlorine, and then refluxing the cyanoethylpolysiloxane with aqueous sodium hydroxide (20 weight percent) to form the sodium salt of carboxyethylpolysiloxane of the formula $$[HOOCC_2H_4SiO_{3/2}]_x$$

where $x$ is an integer greater than 1. The sodium salt is converted to the carboxyethylpolysiloxane by acidification of the sodium salt, with subsequent isolation of the resulting carboxyethylpolysiloxane precipitate. To three solutions made by combining 35.6 parts (0.28 mol) $(CH_3)_2Si(OC_2H_5)_2$ with 160 parts $H_2O$ (maintained at a temperature of about 80° C.) were added, respectively, 1 part, 3 parts, and 6 parts (each in 10 parts water) of the above-prepared carboxyethylpolysiloxane. The resulting reaction products were dried at 110° C. for about four hours to give, in each instance, a cross-linked, solid product. The aforesaid co-reaction product appeared to be intimately interreacted without any evidence of homopolymerization. The product contained intercondensed dimethylsiloxy units and carboxyethylsiloxy units.

*Example 2*

In this example, aqueous solutions of 5 parts of the carboxyethylpolysiloxane described in Example 1 (in 10 parts water) were added with stirring, respectively, to 0.89 part, 1.78 parts, and 0.445 part dimethyldiethoxysilane, each dissolved in 25 parts water maintained at a temperature of about 80° C. The resulting solutions were dried carefully at 110° C. to remove the water and ethyl alcohol formed, to give about 4.2 parts each of a hard solid which comprised intercondensed carboxyethylsiloxy units of the formula $$HOOCC_2H_4SiO_{3/2}$$

and dimethylsiloxy units. The solubility in water of these solid materials increased with decreasing concentrations of the starting dimethyldiethoxysilane.

It will, of course, be apparent to those skilled in the art that other water-soluble carboxyalkylpolysiloxanes, many examples of which have been given before, may be employed in place of the carboxyethylpolysiloxane used in the foregoing examples without departing from the scope of the invention. In addition, it is intended that other types of organoalkoxysilanes can be used, as well as varying concentrations of the latter in combination with carboxyalkylpolysiloxanes.

The carboxyalkylpolysiloxanes of the present invention are useful for many of the applications which organopolysiloxanes containing only silicon-bonded alkyl, aryl, or haloaryl radicals are useful. Thus, the carboxyalkylpolysiloxanes prepared in the above manner are useful as emulsifying agents or as surface active agents. In addition, these compositions can be used as impregnating agents for fabrics and then heated to impart water-repellency to the fabrics. Carboxyalkylpolysiloxanes prepared in accordance with the above described process can also be employed in cutting and sanding applications because they are able to be converted by heat to hard, abrasion-resistant products which have good resistance to heating at elevated temperatures. They are also useful as intermediates in the preparation of esters which are useful as plasticizers for other organopolysiloxane rubbers and resins.

What I claim as new and desire to secure by Letters Patent of the United States is:

1. The process for forming intercondensed organopolysiloxanes containing carboxyalkyl siloxy units and siloxy units free of silicon-bonded carboxyalkyl groups but containing silicon-bonded organic radicals selected from the class consisting of monovalent hydrocarbon radicals and substituted monovalent hydrocarbon radicals, which process comprises heating an aqueous solution of a carboxyalkylpolysiloxane in which the carboxy group is separated from the silicon atom by from 2 to 4 carbon atoms with and an organoalkoxysilane of the formula $$(R)_2Si(OR')_2$$

where R is a member selected from the class consisting of monovalent hydrocarbon radicals and halogenated monovalent hydrocarbon radicals, and R' is a lower alkyl radical.

2. The process as in claim 1 in which the carboxyalkylpolysiloxane is composed of recurring units of the formula $$HOOCC_2H_4SiO_{3/2}$$

3. The process as in claim 1 in which the organoalkoxysilane is dimethyldiethoxysilane.

4. The process as in claim 1 in which the carboxyalkylpolysiloxane is composed of recurring structural units of the formula $$HOOCC_2H_4SiO_{3/2}$$

and the organoalkoxysilane is dimethyldiethoxysilane.

References Cited in the file of this patent

UNITED STATES PATENTS

| | | |
|---|---|---|
| 2,721,856 | Sommer | Oct. 25, 1955 |
| 2,723,987 | Speier | Nov. 15, 1955 |